United States Patent [19]
Olson

[11] Patent Number: 5,562,173
[45] Date of Patent: Oct. 8, 1996

[54] POWER TAKE-OFF ELECTRONIC CONTROL WITH RPM INTERLOCK

[75] Inventor: Daniel E. Olson, Manitoba, Canada

[73] Assignee: New Holland North America, Inc., New Holland, Pa.

[21] Appl. No.: 227,327

[22] Filed: Apr. 14, 1994

[51] Int. Cl.$^6$ ................................................. B60K 17/28
[52] U.S. Cl. ...................... 180/53.4; 180/53.1; 477/174; 477/180
[58] Field of Search ................................ 180/53.1, 53.4; 477/180, 181, 174, 84, 78, 175

[56] References Cited

U.S. PATENT DOCUMENTS

| | | | |
|---|---|---|---|
| 3,773,156 | 11/1973 | Nyquist | 477/174 |
| 3,827,540 | 8/1974 | Bolinger et al. | 477/181 |
| 4,289,222 | 9/1981 | Esthimer | 477/180 |
| 4,583,627 | 4/1986 | Kumura et al. | 477/180 |
| 4,938,302 | 7/1990 | Schott et al. | 180/53.1 |
| 5,105,675 | 4/1992 | Langford et al. | 74/335 |

FOREIGN PATENT DOCUMENTS 37050  10/1981  European Pat. Off. ............... 477/175

*Primary Examiner*—Eric D. Culbreth
*Attorney, Agent, or Firm*—Griffin, Butler, Whisenhunt & Kurtossy

[57] ABSTRACT

In an agricultural tractor having an engine for driving a PTO assembly through a PTO clutch, an interlock circuit includes a microprocessor, a relay and a PTO control switch. The PTO switch controls energization of the engine starter and PTO clutch actuator. The arrangement is such that the engine can be started only when the switch is off and the PTO clutch actuator can be energized only when the switch is on. The microprocessor senses the position of the switch and the speed of the engine and initially energizes the relay to connect battery voltage for energizing the clutch actuator to the switch only when the switch is off and the engine speed is within a predetermined range. When the relay is energized, the clutch actuator may be energized by turning the switch on. If the switch is turned off, the engine speed must be brought back within the predetermined range before the clutch actuator may again be energized.

2 Claims, 2 Drawing Sheets

5,562,173

1

POWER TAKE-OFF ELECTRONIC CONTROL WITH RPM INTERLOCK

FIELD OF THE INVENTION

The present invention relates to a circuit for controlling the power take-off on an agricultural tractor and more particularly to an interlock circuit for preventing engine starts when a power take-off control switch is on and preventing engagement of the power take-off under various conditions such as when the tractor engine is running at higher than some predetermined speed.

BACKGROUND OF THE INVENTION

It is well known that operators of agricultural tractors, either because of lack of knowledge or lack of care, frequently abuse the power take-off (PTO) clutches by engaging the PTO clutch when the tractor engine is running at too high a speed or by engaging the PTO clutch with a stalled output receiving the rotational power from the PTO. This has necessitated the design of clutches with heat-dissipating capacity greater than that required for normal or non-abusive use.

Schott et al U.S. Pat. No. 4,938,302 discloses a mechanical interlock device for preventing PTO clutch engagement when the engine speed is excessive, thereby permitting the use of PTO clutches having reduced heat-dissipating capacity. While the patented device works quite well and serves its intended purpose, it is a mechanical device which may be defeated by an operator. An electrical interlock would be less costly, require less maintenance, and be more difficult to defeat.

SUMMARY OF THE INVENTION

An object of this invention is to provide an electrical interlock for preventing engagement of a power take-off clutch when the speed of the engine delivering power to the clutch is above a predetermined limit.

Another object of the invention is to provide an electrical interlock for preventing engagement of a power take-off clutch when the speed of the engine delivering power to the clutch is above a first predetermined limit or below a second predetermined limit.

A further object of the invention is to provide an interlock circuit for preventing the starting of a tractor engine unless the power take-off clutch is disengaged.

Still another object of the invention is to provide an interlock circuit as described above wherein the interlock function is not easily defeated by an operator.

A further object of the invention is to provide, in an engine driven tractor having a power take-off shaft selectively driven by the engine through a power take-off clutch, an interlock circuit for controlling the clutch, the circuit comprising: a source of voltage; a manually actuated switch means having an on state and an off state; enable means for connecting the source of voltage to the switch means; actuating means for actuating the clutch when the source of voltage is connected to the switch means and the switch means is in the on state; and, control means for controlling the enable means, the control means including first means for sensing the state of the switch, second means for sensing the speed of the engine, and third means responsive to the first and second means for energizing the enable means to connect the source of voltage to the switch means only if the speed of the engine is less than a predetermined speed and

2 the switch is in the off state. When the enable means is energized the clutch may be engaged by changing the switch means to its on state.

Other objects of the invention and the manner constructing and using it will become obvious from the following description and the accompanying drawings.

DESCRIPTION OF A PREFERRED EMBODIMENT

Figure 1:
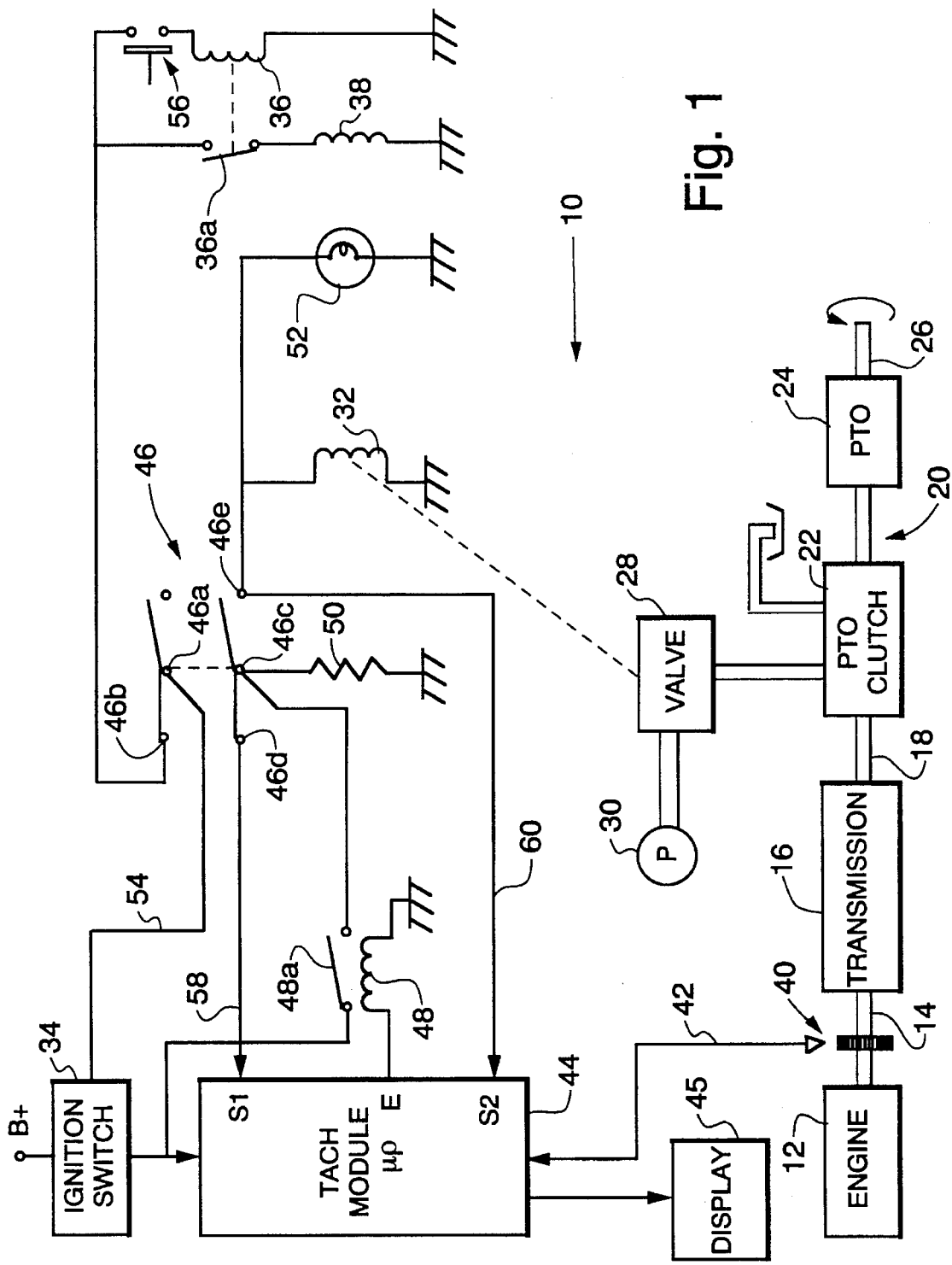
FIG. 1 is a schematic diagram of a tractor, power take-off assembly and an interlock circuit including a microprocessor; and, FIG. 2 is a flow chart illustrating a PTO routine executed by the microprocessor of FIG. 1 to achieve the interlock function.

FIG. 1 schematically illustrates a vehicle such as a tractor 10 having an engine 12 connected by an engine output shaft 14 to a transmission 16. Transmission 16 has an output shaft 18 for driving a power take-off (PTO) assembly 20, the PTO assembly including a clutch 22 and a power transfer box 24 driving a PTO output shaft 26.

Clutch 22 is electro-hydraulically actuated. It is connected through a valve 28 to a source 30 of hydraulic fluid under pressure. Valve 28 is controlled by a solenoid 32. When solenoid 32 is energized, the pressurized fluid from source 30 is applied to the clutch 22 so that it transmits torque from transmission output shaft 18 to the power transfer box 24.

The tractor is provided with an ignition switch 34, a start relay 36 having a set of normally open relay contacts 36a, and a starter coil 38 for cranking the engine 12.

An engine speed sensor 40 of conventional design includes a magnetic sensor for sensing the passage of teeth on a toothed wheel affixed to the engine output shaft 14. The sensor produces output pulses at a frequency proportional to engine speed and these pulses are applied over a lead 42 to a tachometer module 44, which, in a preferred embodiment, comprises a microprocessor and an ADC.

Many commercially available tractors are provided with a instrumentation package including a microprocessor, ADC and associated circuits for monitoring tractor performance and status, providing visual indications thereof, and sounding or displaying warnings if operating conditions are not within prescribed limits. The microprocessor 44 may be the same microprocessor that is used in the instrumentation package although it will be evident from the following description that the function of microprocessor 44, may be embodied in either digital or analog apparatus.

A visual display 45, which may be an LCD device, is provided for displaying the values of various sensed conditions such as engine or PTO RPM.

In accordance with the present invention, an electrical PTO interlock means comprises a DPDT (double pole/double throw) rocker switch 46, hereinafter referred to as the PTO switch, a PTO enable relay 48 having a set of normally open relay contacts 48a, a resistor 50 and an indicator lamp 52.

A first center terminal 46a of switch 46 is connected by a lead 54 to the "crank" position of ignition switch 34. A source of battery voltage (B+) is connected to lead 54 only as long as switch 34 is held in the crank position. A terminal 46b of the switch 46 is connected through a neutral start switch 56 to the start relay 36. As explained in Langford et al U.S. Pat. No. 5,105,675, switch 56 is operated by a gearshift lever (not shown) which controls, through a microprocessor (also not shown) the selection of gears in transmission 16.

A second center terminal 46c of the PTO switch 46 is connected through the relay contacts 48a to the "run" position of ignition switch 34. Terminal 46c is also connected through resistor 50 to ground.

Terminal 46d of switch 46 is connected by a lead 58 to a sense input S1 of microprocessor 44. Terminal 46e is connected to one side of the PTO solenoid 32 and one side of the PTO indicator lamp 52. In addition, terminal 46e is connected by a lead 60 to a sense input S2 of the microprocessor 44.

The rocker switch 46 controls the PTO clutch 22 by controlling energization of the solenoid 32 associated with valve 28. The switch is illustrated in the "off" position so that solenoid 32 is not energized and valve 28 blocks the application of hydraulic fluid under pressure to PTO clutch 22.

The engine 12 may be started only when the PTO switch 46 is in the off position and the gearshift lever neutral switch 56 is closed, that is, the transmission 16 is in neutral. When the operator turns the ignition switch 34 to the crank position, battery voltage is applied over lead 54 and through switches 46 and 56 to the start relay 36. This energizes the relay to close contacts 36a thereby establishing a circuit from the battery through ignition switch 34, PTO switch 46, contacts 36a and starter coil 38 to ground, to energize the starter coil.

The energized coil cranks engine 12 and once the engine is running the operator may release the ignition switch and it returns to the run position. This terminates the voltage on lead 54 thus de-energizing starter coil 38 and start relay 36.

Figure 2:
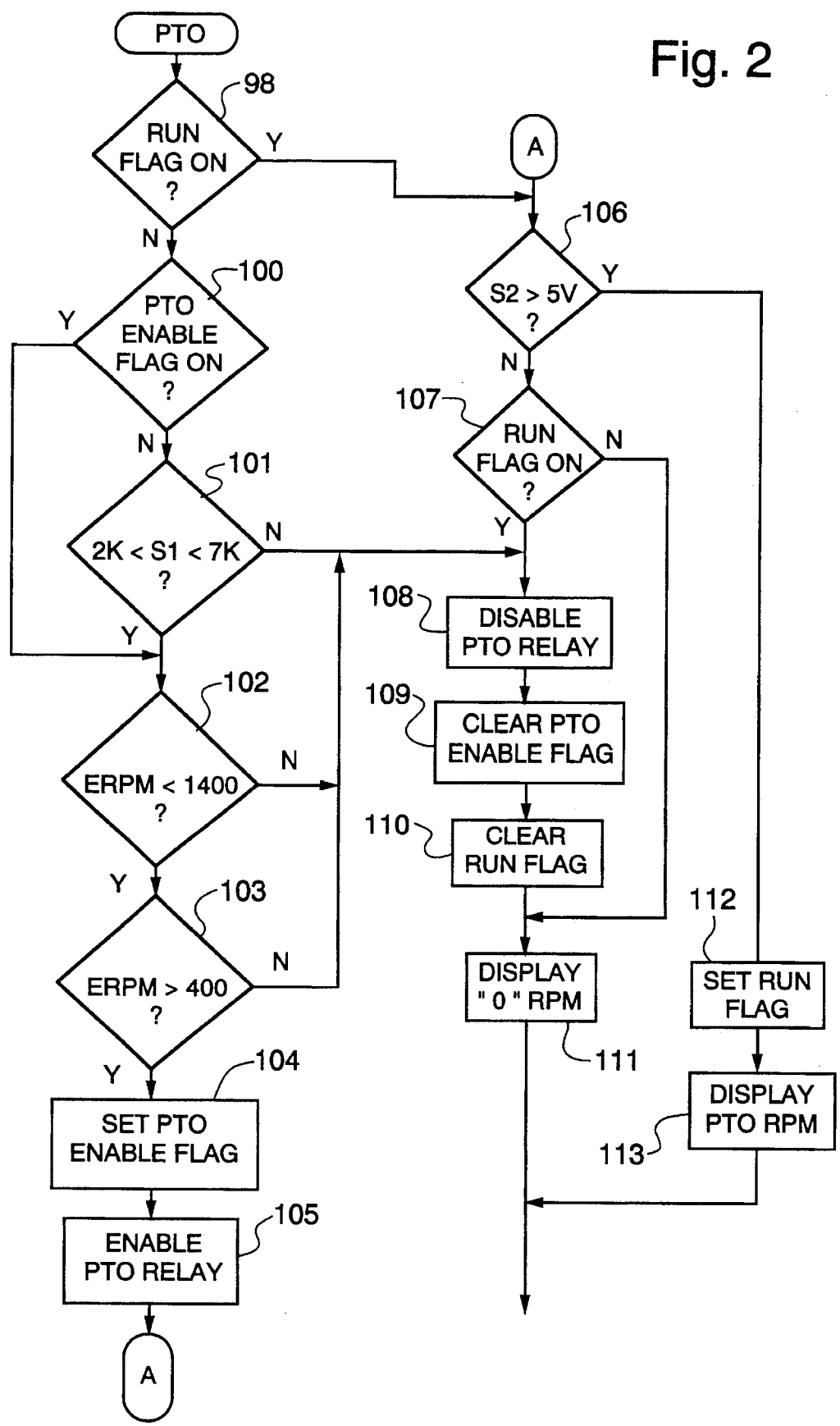

When the ignition switch 34 is in the run position it applies battery voltage to microprocessor 44 and to one side of relay contacts 48a which are still open at this time. The microprocessor begins executing a program which is repeated in the order of every 20 ms. FIG. 2 shows only that portion of the program necessary for an understanding of the present invention.

At step 98 a RUN flag is tested. This flag is turned on as subsequently described and is on during intervals the PTO clutch is engaged. Assuming that the RUN flag is off, the program advances to step 100 where a PTO ENABLE flag is tested. This flag is set as subsequently described. Generally speaking, the flag is in the set condition when circuit conditions are such that the PTO will be engaged if the PTO switch 46 is moved to or is in the on position.

Assuming that the PTO ENABLE flag is off, the microprocessor 44 (at step 101) applies a sense signal to lead 58, converts the resulting voltage at the terminal S1 to a digital value, and compares the digital value to an upper limit value ULV and a lower limit value LLV to determine if the digital value falls within the range bounded by ULV and LLV. The purpose of step 101 is to check the functional integrity of the sense lead 58.

Referring to FIG. 1, the resistor 50 has some predetermined resistance such as 5 k ohms. If a sense voltage of known magnitude is applied through a resistor in the tachometer module to the sense line 58, the voltage at terminal S1 will have a magnitude determined by the resistance between terminal S1 and ground. That is, when the sense signal is applied to lead 58 a known voltage should be present at terminal S1 if lead 58 is not shorted or open circuited. Since resistor 50 has a resistance of 5 K, the limit values ULV and LLV are chosen to represent voltages which would appear at terminal S1 if the sense signal should see a resistance as great as 7 K or less than 2 K. Thus, when step 101 compares the sensed voltage at S1 with the limits ULV and LLV and the sensed voltage is not between the two limits, it is an indication that lead 58 is either open or shorted and the PTO should not be enabled because the control circuit is faulty.

In FIG. 2, if the test at step 101 shows that the resistance seen by the sense signal at terminal S1 is not greater than LLV and less than ULV, the program jumps to step 108 where the microprocessor sets the voltage at its output terminal E so that the PTO relay 48 is not energized. The PTO ENABLE flag is cleared (step 109) and the RUN flag is cleared (step 110). At step 111 the microprocessor sets the output signals to display 45 so that "0" RPM is displayed.

After step 111 is executed the microprocessor continues with control steps not relevant to the present invention. After about 20 ms, the program again reaches the PTO routine and steps 98, 100, 101 and 108–111 are again executed. The microprocessor will continue to execute these steps each time the PTO routine is reached so that the PTO cannot be activated because the sense lead 58 is either open or shorted.

If the test at step 101 shows that the sense lead 58 is operative, the engine speed is tested to see if it is greater than 1400 RPM (step 102) or less than 400 RPM (step 103). The PTO should not be engaged when the engine speed is greater than 1400 RPM since this might cause damage to the PTO assembly because of excessive heat generation. If the test at step 101 shows the engine speed to be less than 400 RPM, the engine 12 is not running; however, it is undesirable to have the PTO assembly enabled when the ignition switch 34 in the "on" or run position without the engine 12 running or when the ignition switch 34 is in the "crank" position because of the added load of the PTO assembly and the possibility of an inadvertent operation of the PTO assembly upon the starting of the engine 12. If the engine speed is not between 1400 and 400 RPM the program will jump from step 102 or 103 to step 108, and proceed to execute steps 108–111 as previously described.

If the test at step 101 shows that the sense lead 58 is operative and the tests at steps 102 and 103 show that the engine speed is between 400 and 1400 RPM, the PTO is enabled. The PTO ENABLE flag is set at step 104. At step 105 the microprocessor sets the voltage at terminal E so that the PTO relay 48 is energized. Relay contacts 48a close so that battery voltage is applied to terminal 46c of the PTO switch 46. Since the switch 46 is still in the off position, the battery voltage is not applied to the PTO solenoid 32. In FIG. 2, the microprocessor executes step 106 to determine if the voltage at terminal S2 is greater than 5 V, that is, to determine if the PTO switch is on. Since the switch is off, a RUN flag is tested at step 107. Since the RUN flag has not been set, the program jumps to step 111 to display "0" RPM and then continues with other operations.

As long as the engine speed remains in the range of 400–1400 RPM and the PTO switch 46 is not switched on, the microprocessor repeatedly executes the loop comprising steps 98, 100, 102–107 and 111. The operator may engage PTO clutch 22 at any time by moving switch 46 to the on position. In FIG. 1, when switch 46 is turned on, battery voltage is applied through switch contacts 46c, 46e to the solenoid 32. As the solenoid is actuated, it controls valve 28 so that fluid under pressure is applied to clutch 22 causing it to engage. At the same time, the battery voltage energizes lamp 52 to provide the operator with a visual indication that the PTO is engaged.

In FIG. 2, the next time the PTO routine is executed after the switch 46 is turned on, the test at step 106 proves true because the battery voltage (greater than 5V) is present at switch terminal 46e. The RUN flag is set at step 112 and at step 113 signals are sent to display 45 to display the PTO speed in RPM.

Once the RUN flag is set, the microprocessor repeatedly executes the loop comprising steps 98, 106, 112 and 113 as long as the PTO switch is in the on position. The test at step 98 always finds the RUN flag set so the engine speed tests at steps 102 and 103 are not performed. Thus, once the PTO is engaged, the operator may change the engine speed as he wishes and the PTO will remain active as long as the PTO switch 46 is not switched from the on position.

The operator may deactivate the PTO by moving the PTO switch away from the on position. In FIG. 1, this breaks the circuit between battery power and PTO solenoid 32 and lamp 52. When the solenoid is de-energized valve 28 closes and PTO clutch 22 disengages. The lamp 52 is extinguished to inform the operator that the PTO is inactive.

In FIG. 2, the next execution of step 106 after the PTO switch is moved away from the on position detects that battery voltage is no longer present at switch terminal 46e. The RUN flag is then tested (step 107) and since it is on the PTO ENABLE relay 48 is de-energized (step 108), the PTO ENABLE flag is cleared (step 109), the RUN flag is cleared (step 110) and signals are sent to display 45 (step 111) so that "0" RPM is displayed.

The interlock arrangement of PTO switch 46, sense line 60, microprocessor 44 and relay 48 not only controls the conditions under which the PTO may be initially engaged, the arrangement also prevents and operator from defeating the purposes of the interlock. The enable output E of microprocessor 44 is active to enable relay 48 only as long as the voltage at terminal 46e and microprocessor input S2 are at battery voltage. If the operator should move switch 46 out of the on position, input S2 drops below 5 V and relay 48 drops out thus breaking the connection between B+ and the switch 46. This ensures that the operator will have to return the switch 46 to the off position before battery power can be reconnected to the switch by energizing the PTO relay 48.

The interlock arrangement also prevents an operator from engaging the PTO when the engine speed is above 1400 RPM. Assume for example that an operator turns the PTO switch on while the engine speed is less than 1400 RMP so that the PTO clutch is engaged, then turns switch 46 off, increases the engine RPM to above 1400 RPM, and turns the switch 46 back on. Re-engagement of the PTO is prevented because when switch 46 is turned off input S1 drops. This causes the enable output E to drop so that relay 48 drops out thereby disconnecting B+ from switch 46 and preventing re-energization of the PTO solenoid 32 when switch 46 is turned back on.

The interlock arrangement requires that the PTO switch 46 be returned to the off position to reestablish the enable power, that is, battery power to switch 46 which would enable the PTO solenoid 32 to be engaged if switch 46 is turned back on. This ensures that the PTO has been shut off and restarts the inhibit feature. For example, assume that the PTO is engaged with the engine RPM above 1400 when the PTO switch is turned off. The next execution of step 106 shows less than 5 V at microprocessor input S2 so the PTO relay 48 is de-energized and the RUN and PTO ENABLE flags are cleared. When the PTO relay drops out, battery voltage to PTO switch 46 terminates as relay contacts 48a open. If the operator turns the PTO switch on while the engine speed is still above 1400 RMP the PTO will not engage. Since the RUN and PTO ENABLE flags are off the test at step 101 is performed and proves false because the PTO switch is on. Therefore, the PTO relay 48 remains disabled (step 108).

The PTO clutch cannot be re-energized even if the operator lowers the engine speed to less than 1400 RMP because the test performed at step 101 will still prove false. In order to re-engage the PTO clutch the operator must set the engine speed in the range 400–1400 RPM while the PTO switch is off so that the circuit integrity test (step 101) and the engine speed tests (102 and 103) prove true. If these tests do not prove true steps 108–111 are executed to display "0" RPM, clear the PTO ENABLE and RUN flags and disable the PTO relay 48. If these tests all prove true simultaneously the PTO clutch may be engaged (or reengaged) as previously described by turning the PTO switch 46 on.

From the foregoing description it is seen that the present invention provides an interlock system that is not easily defeated by an operator. In order to bypass the interlock feature an operator would have to bypass the complete control circuit by, for example, connecting the PTO clutch solenoid directly to the battery voltage.

While a preferred embodiment has been described in specific detail to illustrate the principles of the invention, it will be understood that various modifications and substitutions may be made in the described embodiment without departing from the spirit and scope of the invention as defined by the appended claims. In particular, although the preferred embodiment is implemented with a programmable microprocessor, it will be obvious that in other embodiments the invention may be implemented using analog circuits. The relay 48 need not be an electro-mechanical relay but may be a solid state relay.

We claim:

1. An engine driven tractor having a power take-off shaft selectively driven by the engine through an electro-hydraulically actuated power take-off clutch, a start means for starting the engine, a voltage source for energizing said start means and the power take-off clutch, a switch for selectively connecting the voltage source to the start means and the power take-off clutch, said switch comprising a manually actuated switch having first and second sets of electrical contacts and an on state and an off state, said first set of contacts being connected between said voltage source and said start means whereby said start means is energizable only when said switch is in said off state and said second set of contacts being connected between said voltage source and said power take-off clutch whereby said power take-off clutch is energizable only when said switch is in said on state, enable means including a relay having a set of relay contacts connected between said voltage source and said second set of contacts, an engine speed sensor, and control means connected to first and second contacts of said second set of contacts and responsive to said speed sensor for initially energizing said relay to connect said voltage source to said switch only if said switch is in said off state and said sensor senses an engine speed less than a predetermined speed and thereafter maintaining said relay energized when said switch is changed to said on state.

2. The improvement as claimed in claim 1 wherein said electro-hydraulically actuated clutch includes a solenoid connected to said second set of contacts and energizable from said voltage source only when said switch is in said on state and said enable means connects said voltage source to said switch.

* * * * *